Oct. 17, 1967

JAMES E. WEBB
ADMINISTRATOR OF THE NATIONAL
AERONAUTICS AND SPACE ADMINISTRATION
SELF-ADJUSTING, MULTI-SEGMENT, DEPLOYABLE, NATURAL
CIRCULATION RADIATOR 3,347,309

Filed June 16, 1966

INVENTORS
ARNOLD H. REDDING
ROBERT A. MARKLEY
WALTER D. POUCHOT

BY *Harvey S. Boyd*

ATTORNEY

Oct. 17, 1967
JAMES E. WEBB
ADMINISTRATOR OF THE NATIONAL
AERONAUTICS AND SPACE ADMINISTRATION
SELF-ADJUSTING, MULTI-SEGMENT, DEPLOYABLE, NATURAL
CIRCULATION RADIATOR
3,347,309
Filed June 16, 1966
2 Sheets-Sheet 2
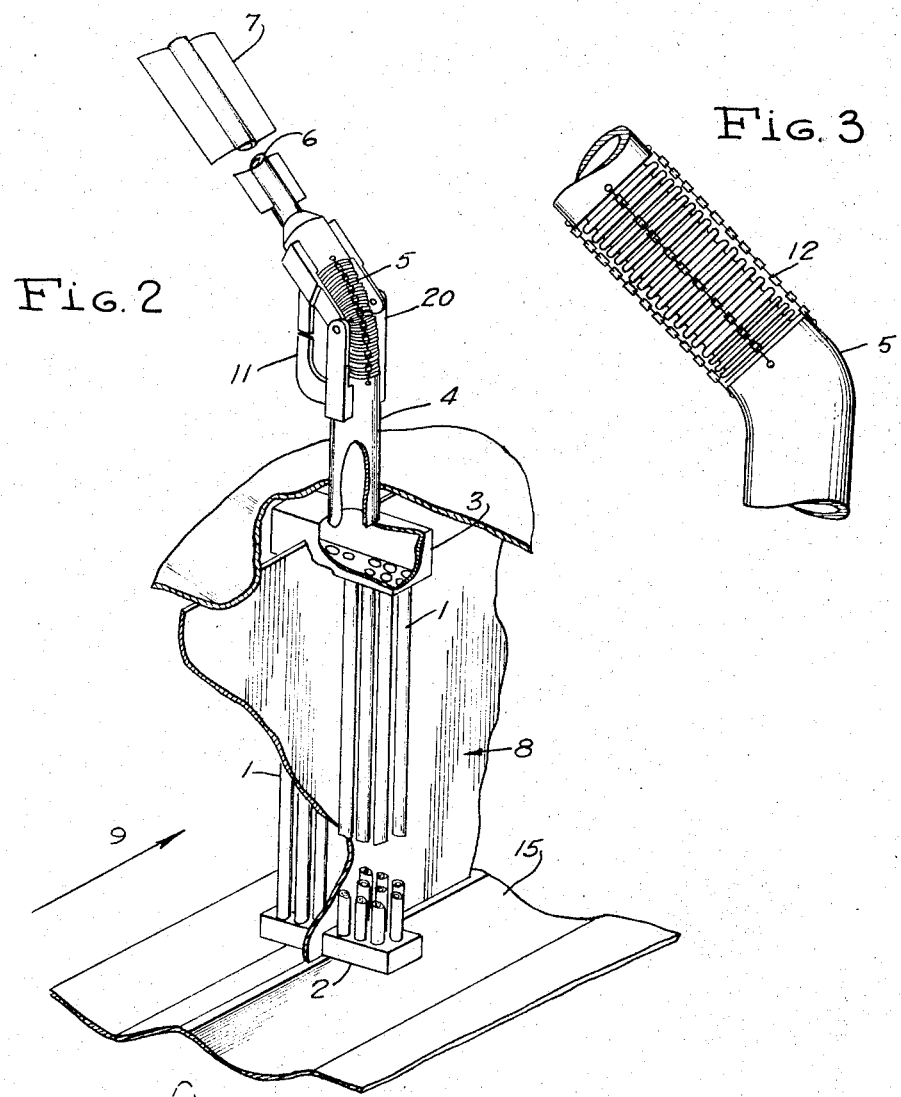
INVENTORS
ARNOLD H. REDDING
ROBERT A. MARKLEY
WALTER D. POUCHOT
BY *Harvey S. Boyd*
ATTORNEY

३,३४७,३०९

SELF-ADJUSTING, MULTISEGMENT, DEPLOY-ABLE, NATURAL CIRCULATION RADIATOR

James E. Webb, Administrator of the National Aeronautics and Space Administration, with respect to an invention of Arnold H. Redding, Los Altos Hills, Calif., and Robert A. Markley, Export, and Walter D. Pouchot, Monroeville, Pa.
Filed June 16, 1966, Ser. No. 559,055
6 Claims. (Cl. 165—86)

This invention relates generally to radiators and more particularly to radiators for use with the nuclear power plants which furnish electrical energy to lunar space stations.

The problems inherent to obtaining an operational waste heat dissipation system, such as a radiator, for use in the moon's environment are many. First, there is the problem of getting the system to the moon. The launch system presently envisioned for a lunar space station will limit the lunar space station's total weight to 25,000 pounds. This limitation requires that the heat dissipation system be as light as possible. Weight considerations are also important when viewed from a cost standpoint. The radiator's configuration must also be compatible with the shape of the payload package.

Secondly, once the payload has landed on the moon and the power plant has been put into operation, the problems of heat dissipation, of meteoroid bombardments, and of maintenance become paramount factors. The environmental conditions on the lunar surface greatly affect the method of heat dissipation. For instance, the absence of an atmosphere precludes removal of waste heat from the power plant by convection and the lack of known lunar heat sinks precludes conduction. The great mass of heat must, therefore, be radiated into space. As is well known, the energy radiated from an object is proportional to the fourth power of the temperature times the area times the emissivity of the radiating surface. Simple analysis shows that for reasonable size power plants operating at reasonable temperatures quite large conventional, and hence quite heavy, radiators would be required. When operating such power plants at remote locations such as on the lunar surface, on-site radiator construction is undesirable. Also, during launch and landing operations or if an orbiting vehicle is anticipated, it will be necessary to fold and unfold the radiator. Accordingly, such plants should include radiators which are self-deploying and self-adjusting since the surface of the capsule is not sufficient to satisfy the requirements for radiation of the waste heat of the plant.

Also, due to the surface temperature of the moon varying from —250° to 250° and due to the varying amount of waste heat produced by the power plant, the rate of heat rejection from a conventional radiator would vary so widely that such a radiator would very likely freeze up and become inoperative during low power, low temperature operation.

The environment of the moon, as almost everywhere in space not protected by an atmosphere, abounds in meteoroids of various sizes. To provide for any kind of reliability at all, lunar radiators must be protected against bombardment by such objects. The design thickness of radiator walls is generally derived by an equation of the following form:

$$t = C\left(\frac{A\theta}{-\ln P_0}\right)^{1/3}$$

where C is a constant dependent on the material of the wall and its temperature, A is the area exposed to meteoroids, $\theta$ is the time of exposure, and $P_0$ is the design rate of probability of survival. It can be seen that to obtain a high survival probability, conventional radiator walls must be quite thick, and hence, quite heavy. This requirement is inconsistent with the launch requirement of light weight. Also, even if a conventional radiator were heavily armored so as to have a high probability of survival (for instance 90 percent), it would still not be reliable enough for use on the moon because it would have a 10 percent chance of being rendered completely inoperative. This would not be acceptable since no replacement parts would be available on the moon. It can be seen from the above formula that if the radiator can be divided into a large number of independent segments, each of a much smaller area than the total radiator area, the thickness of the radiator tube walls for the same probability of survival for each segment could be substantially reduced. Under these conditions it is also evident that the probability of a substantial portion of the radiator remaining is greatly enhanced.

The high cost of labor, plus the difficulties in supplying replacement parts to the moon, make it imperative that a lunar waste heat radiator must be as maintenance-free as possible. Present estimates are that such a radiator must be able to radiate waste heat for 10,000 maintenance-free hours from a nuclear power plant capable of producing 100 kwe.

Another problem arises as the result of the nuclear power plant for the lunar base being designed to contain two redundant power sources. One conventional radiator for each source would be undesirable in view of the weight and space limitation on the payload.

It is, therefore, an object of this invention to provide a radiator which has far greater reliability and far less weight than presently known radiators, and yet still have equivalent heat rejection capabilities.

A further object of this invention is to provide a radiator which can be used in a power plant having dual redundant energy producing means.

It is a further object of this invention to provide a segmented radiator employing a heat exchanger portion and a radiation portion to achieve light weight and minimum size.

Another object of this invention is to provide a self-deploying radiator which would be capable of varying its heat rejection surface automatically to maintain a constant surface temperature.

Yet another object of this invention is to provide a radiator which would not require replenishment of its working fluid.

Still another object of this invention is to provide a radiator which will be compatible with the physical characteristics of a payload to be landed on the moon.

A further object of this invention is to provide a radiator which will retain some of its heat rejection capabilities even though a portion of it is destroyed by meteoroid bombardment.

Other objects and a fuller understanding of the invention may be had by referring to the following description and claims, taken in conjunction with the accompanying drawings in which:

FIG. 2 is a partial cutaway perspective view of one segment of the radiator;

FIG. 3 is a view of the bellows section of the radiator; and

FIG. 4 is a schematic representation showing the position of the radiator in relation to the other parts of the lunar space station's power plant.

Figure 1:
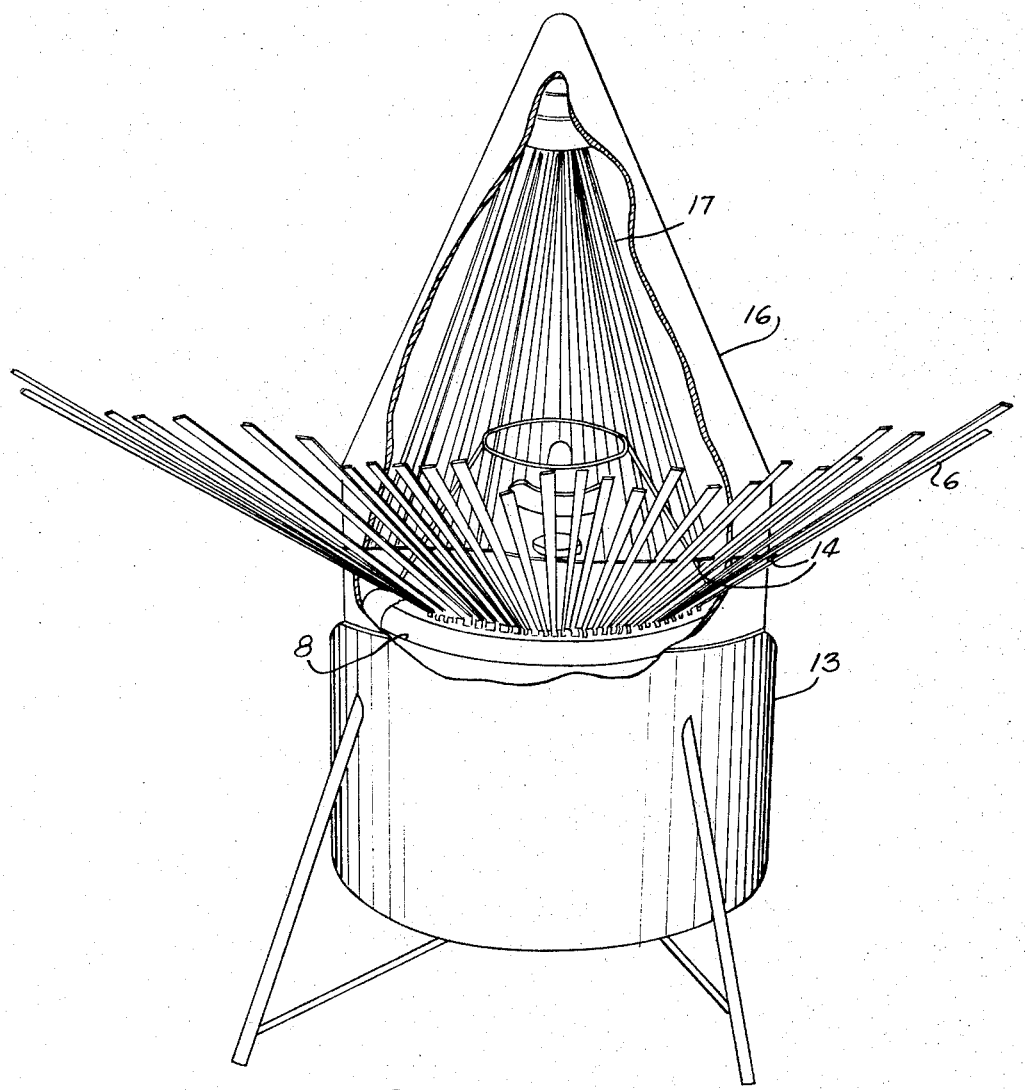
FIG. 1 is a partial cutaway showing the radiator in its deployed position.

With reference to FIG. 2, each segment of the radiator is comprised of a multiplicity of boiler tubes 1, a lower header 2, an upper leader 3, a steam riser tube 4, a flexible bellows 5 reinforced by a hinge 20, a radiating tube 6, and fins 7. The tubes 1 are equally divided numerically between the two manifold areas shown generally as 8 and 9. Each of the two manifolds is connected to the exhaust ports of one of two dual redundant nuclear power plants contained in the lunar space station. Heat from the power plant in operation, as represented by power plant 16 in FIG. 4, will pass through line 19 to the electric generator 18 and hence through its manifold, for instance manifold 8, until finally the heat comes in contact with the tubes 1. Heat from the exhaust will then be transferred to the liquid which is contained in the tubes 1. Potassium, mercury and water have been used satisfactorily as this refluxing liquid. This heat transfer causes the exhaust vapor from the power plant to condense on the outside of tubes 1 and from there it runs down and drips into the trough 15. The condensate is returned to the power plant through line 10, as shown in FIG. 4. It should be noted that power plants operating on the surface of the moon will be subjected to a gravitational force of approximately one-sixth that of the earth. This environmental factor allows the various fluids and condensates to circulate within the radiator and power plant by natural circulation. For zero gravity space applications, each segment of a multi-segmented radiator would require a pump of some kind for circulating the fluids. This would entail a considerable penalty, both because of the pump's weight and the added unreliability which multiple pumps introduce.

The heat passing from the exhaust into the liquid in the tubes 1 causes the liquid therein to boil. The vapor formed by this boiling action rises through steam riser tube 4, through bellows 5 and into the radiating tube 6. The loss of heat by radiation to space through the tube 6 and the fins 7 then causes the vapor to condense on the inside of tube 6. This condensate is returned to the boiler tubes 1 by gravitational force. It can be seen that no liquid is lost during this heat rejection operation. This is very important on the moon because replenishment would be difficult.

It can also be seen that since exhaust is only being supplied to one of the manifolds 8 and 9, the boiler tubes in the manifold receiving the exhaust will act as riser tubes and the tubes in the manifold attached to the non-functioning power source will serve as downcomers.

As the radiating tube 6 starts to reject heat, the vapor pressure within the hermetically sealed radiator segment begins to rise. With water as the refluxing fluid, the pressure rise is from a few p.s.i.a. during storage to 300–350 p.s.i.a. at full power operation The pressure rise causes the bellows 5 to straighten out and become rigid The bellows 5 is so positioned that in its straightened position the radiating tube 6 is fully deployed as shown in FIG. 1. The radiator is furnished with a stop 11 which curtails the deployment of the tube 6. Also, as shown in FIG. 3, the bellows 5 is furnished with restraining cables 12 to prevent over-expansion of the bellows in the longitudinal direction.

The power plant's turbine exhaust manifolds 8 and 9 are annular and surround the plant's circular reactor shield. The independent radiator segments described above are arranged in a circular array around the exhaust manifolds as shown in FIG. 1. As the lunar station is presently designed, there are 240 separate reflux radiator segments included in this array. Each of these segments is hermetically sealed and the fluid therein is not connected in any way to either the working fluid of the power plant or to that of the other radiator segments. This fragmenting of the radiator achieves both a weight and reliability advantage. The radiating tubes 6 are restrained in a stored position in the rocket payload section 13, as shown by lines 17 in FIGS. 1 and 4, by a cable 14 which is partially wound on a spring-loaded reel that is locked during storage. After landing, the shroud 16 is removed and the reel unlocked preparatory to operating the plant. In operation, when the plant is run at part load or the environmental temperature drops, the temperature of the radiating tubes 6 and the internal vapor pressure within each segment will decrease. This reduced pressure will soften the bellows 5 and allow the spring-loaded cable 14 to pull all the tubes towards their stored position. This process reduces the effective radiator surface area and tends to maintain the temperature of the tubes 6. The chief virtue of this constant temperature in a lunar power plant design is to prevent the radiator from freezing up during low power, low ambient temperature operation. In a reflux boiler type of radiator, the most probable mode of freezing would cause the boiler to run dry. This, in turn, would allow overheating of the plant and make it necessary to shut the plant down until the ambient temperature rose above the freezing point of the radiator fluid.

Although we have described our invention with a certain degree of particularly, it is understood that the present disclosure has been made only by way of example and that numerous changes in the details of construction and the combination and arrangement of parts may be resorted to without departing from the spirit and scope of the invention as hereinafter claimed.

What is claimed is:

1. A radiator for use in combination with a power plant for rejecting heat generated by said power plant, said radiator comprising:
    (a) a plurality of segmented radiating elements communicating with the exhaust manifold of the power plant;
    (b) each of said plurality of segmented radiating elements comprising a rigid heat exchanger portion and a movable fluid conducting portion, said rigid and movable portions interconnected by a hollow, flexible member;
    (c) hinge means spanning said flexible member; and
    (d) stop means for limiting the travel of said movable portion.

2. A radiator construction for use in combination with a power plant having dual turbine prime movers comprising:
    (a) independent vapor manifolds associated with each of said dual turbine prime movers;
    (b) a plurality of segmented radiating elements communicating with said independent vapor manifolds;
    (c) each of said segmented radiating elements comprising a dual rigid heat exchanger and a movable fluid conducting portion, said heat exchanger and movable portions interconnected by a hollow flexible member and said movable portion closed at the distal end thereof;
    (d) each section of said dual, rigid heat exchanger communicating with one of said independent vapor manifolds and said movable portion disposed for selective communication with each section of said dual, rigid heat exchanger;
    (e) hinge means spanning said hollow flexible member and including stop means for limiting the travel of said movable portion; and
    (f) means for restraining angular deployment of said movable portion relative to said rigid portion.

3. A radiator as recited in claim 2 in which each dual, rigid heat exchanger portion of said radiator construction comprises:
    (a) a first header;
    (b) a plurality of tubes, one end of each of said tubes extending into said first header and the other end thereof extending outwardly from said first header;
    (c) each of said tubes containing a heat transfer fluid;
    (d) a second header attached to said tubes at the end of said tubes opposite said first header; and
    (e) a riser tube attached to and extending outwardly from said second header at a position above the ends of said plurality of tubes so that the heat transfer fluid vapor produced by heat energy from the exhaust vapor of the turbine prime movers passing through said independent vapor manifolds will rise through said riser tube, said hollow, flexible member and said movable portion.

4. A radiator construction as recited in claim 2 in which said means for restraining the deployment of said movable portion comprises:
 (a) an inexpansible cable encircling said movable portions of said radiator and attached to each said movable portion;
 (b) a reel onto which said cable is wound, said cable being attached to a spring contained in said reel in such a manner that the spring opposes the unwinding of the cable from the reel; and
 (c) a lock mounted on said reel, said lock being capable of holding said reel in any desired position.

5. The radiator construction as recited in claim 2, in which the hollow flexible member comprises:
 (a) a bellows; and
 (b) a multiplicity of nonexpansible cables attached longitudinally on said bellows.

6. A radiator construction as recited in claim 2 wherein said movable fluid conducting portion comprises:
 (a) an elongated tubular member; and
 (b) external fins extending longitudinally thereof.

References Cited
UNITED STATES PATENTS

| | | | |
|---|---|---|---|
| 2,503,411 | 4/1959 | Prowse | 123—41.31 |
| 3,208,438 | 9/1965 | White | 123—41.5 |
| 3,260,305 | 7/1966 | Leonard et al. | 165—67 |

CARLTON R. CROYLE, *Primary Examiner.*